United States Patent
Choi et al.

(10) Patent No.: US 7,917,663 B2
(45) Date of Patent: Mar. 29, 2011

(54) METHOD FOR CONFIRMING CONNECTION STATE OF A HOME APPLIANCE IN HOME NETWORK SYSTEM

(75) Inventors: Hwan Jong Choi, Kyongsangnam-do (KR); Koon Seok Lee, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 10/508,022

(22) PCT Filed: Apr. 10, 2002

(86) PCT No.: PCT/KR02/00647
§ 371 (c)(1),
(2), (4) Date: Sep. 16, 2004

(87) PCT Pub. No.: WO03/079610
PCT Pub. Date: Sep. 25, 2003

(65) Prior Publication Data
US 2005/0149642 A1    Jul. 7, 2005

(30) Foreign Application Priority Data
Mar. 20, 2002 (KR) .............................. 2002-0015085

(51) Int. Cl.
*G06F 9/00* (2006.01)
(52) U.S. Cl. ............................................. 710/10; 710/9
(58) Field of Classification Search .................. 710/8, 9, 710/17, 19, 15, 3, 10; 307/1
See application file for complete search history.

(56) References Cited

U.S. PATENT DOCUMENTS

| | | | |
|---|---|---|---|
| 4,937,825 A * | 6/1990 | Ballard et al. | 714/712 |
| 5,539,390 A | 7/1996 | Nagano et al. | |
| 5,980,078 A * | 11/1999 | Krivoshein et al. | 700/1 |
| 6,052,750 A | 4/2000 | Lea | |
| 6,799,204 B1 * | 9/2004 | Baba et al. | 709/220 |
| 7,028,228 B1 * | 4/2006 | Lovy et al. | 714/57 |
| 2002/0062365 A1 | 5/2002 | Nishikawa et al. | |

FOREIGN PATENT DOCUMENTS

| | | |
|---|---|---|
| JP | 2001-359176 | 12/2001 |
| KR | 10-2000-0024838 | 5/2000 |
| KR | 10-0357045 | 10/2002 |

(Continued)

OTHER PUBLICATIONS

Kastner et al.; "How Dynamic Networks Work: A Short Tutorial on Spontaneous Networks"; 2001; IEEE, pp. 295-303.*

(Continued)

*Primary Examiner* — Chun-Kuan Lee
*Assistant Examiner* — Benjamin P Geib
(74) *Attorney, Agent, or Firm* — McKenna Long & Aldridge LLP

(57) ABSTRACT

A method for confirming connection state of a home appliance in home network system is disclosed, which includes a step in which the home appliance periodically confirms the connection state to the home network system, a step in which the appliance generates a packet for requiring address allocation, a step in which the appliance transfers the packet to network managing appliance, a step in which the appliance generates an alive notifying packet on allocating the address of the appliance from the network managing appliance, and a step in which the appliance transfers the alive notifying packet to the network managing appliance.

4 Claims, 2 Drawing Sheets

FOREIGN PATENT DOCUMENTS

WO    WO-98/59282 A2    12/1998

OTHER PUBLICATIONS

"Universal Plug and Play Device Architecture," Microsoft Corporation, UPNP Forum, Jun. 8, 2000.

"Simple Service Discovery Protocol/1.0," IETF Internet Draft, Oct. 28, 1999 (pp. 1-18), XP002301183.

"Dynamic Host Configuration Protocol," IETF RFCS, Mar. 1997, XP002193184.

* cited by examiner

METHOD FOR CONFIRMING CONNECTION STATE OF A HOME APPLIANCE IN HOME NETWORK SYSTEM

TECHNICAL FIELD

The present invention relates to a home network system, and more particularly, to a method for verifying a connection state of a home appliance, in which a connection state of home appliances to a home network system is verified through a PnP (Plug and Play).

BACKGROUND ART

Currently, the home automation almost comes to a stage to put into practical use, in which home appliances are controlled automatically in a home or far from the home. Though an initial home automation is at a level the appliances are controlled separately by using a telephone line or an infrared ray, without interconnection between the appliances, currently a method is used, in which a network of the appliances are constructed by employing communication means, and a controller for controlling the network is provided, for integrated management of the network.

A related art method for verifying a connection state of a home appliance in a home network system will be explained, with reference to the attached drawings. FIG. 1 illustrates a system of a related art home network, schematically.

Referring to FIG. 1, the related art home network system is provided with a network managing home appliance 10 for managing a network, and a plurality of home appliances 20-50 connected to the network managing home appliance 10.

When the network managing home appliance 10 intends to verify connection states of the home appliances 20-50, the network managing home appliance 10 having a managing function calls a state requesting signal to respective home appliances 20-50, and the home appliances called from the network managing home appliance 10 feed responsive signals back to the network managing home appliance 10. Then, the network managing home appliance 10 can monitor, and display the connection states of the home appliances.

However, the related art home network system has a problem in that the network managing home appliance can know a changed state of the appliance only when the network managing home appliance calls the appliance if a connection state of the appliance is changed, or if it is required to verify the connection state of the appliance.

DISCLOSURE OF INVENTION

An object of the present invention designed for solving the foregoing problem lies on providing a method for verifying a connection state of a home appliance in a home network system, which can verify the present connection state of a home appliance effectively always.

The object of the present invention can be achieved by providing a method for verifying a connection state of a home appliance in a home network system having a plurality of home appliances connected thereto, including a first step of the home appliance confirming connection of the home appliance to a home network periodically, and producing a request for assigning an address and transmitting to a network managing appliance accordingly, and a second step of the home appliance producing an alive notify packet, and transmitting to the network managing appliance, if the address is assigned to the home appliance from the network managing appliance.

Thus, the present invention can effectively verify the present connection state by periodically informing that the home appliance itself is connected to a network and assignment of an address thereto to a network managing home appliance.

BRIEF DESCRIPTION OF DRAWINGS

The accompanying drawings, which are included to provide a further understanding of the invention illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In explaining the present invention, identical parts will be given the same names and reference symbols, and iterative explanation of which will be omitted.

Figure 1:
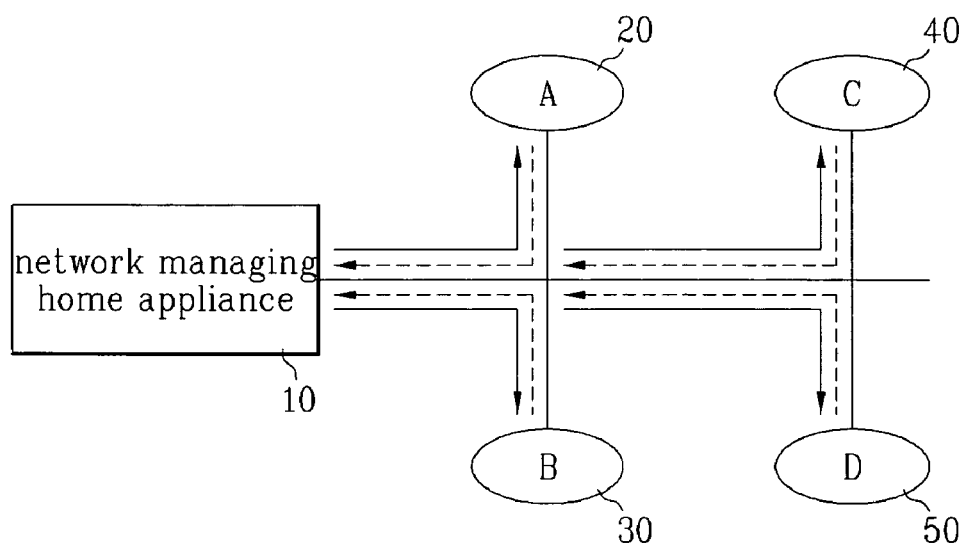
FIG. 1 illustrates a block diagram showing a related art method for verifying a connection state of home appliances in a home network system.
Figure 2:
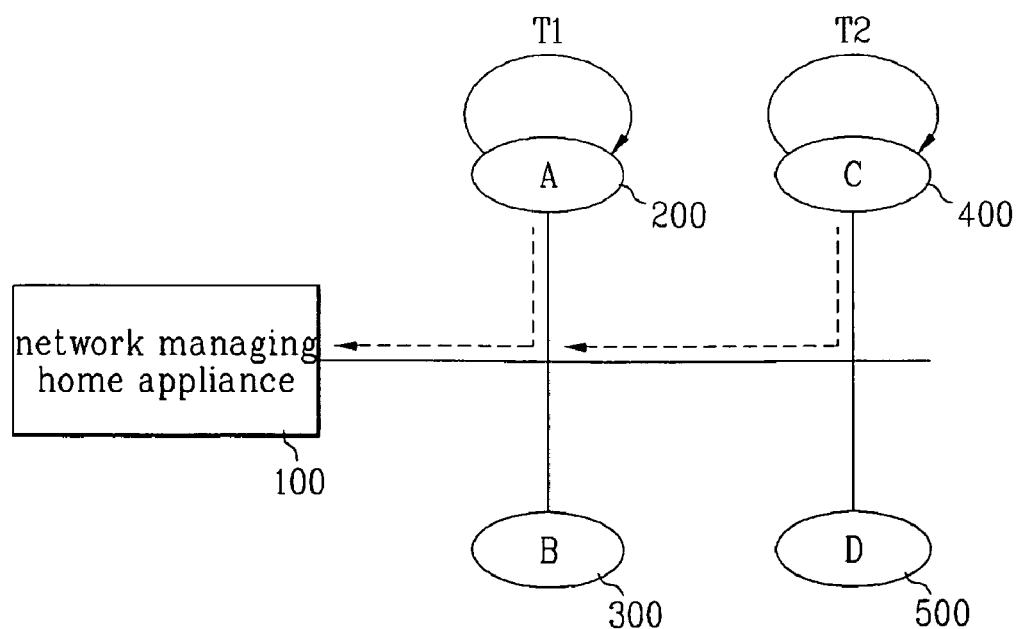
FIG. 2 illustrates a block diagram showing a method for verifying a connection state of home appliances in a home network system in accordance with a preferred embodiment of the present invention.
Figure 3:
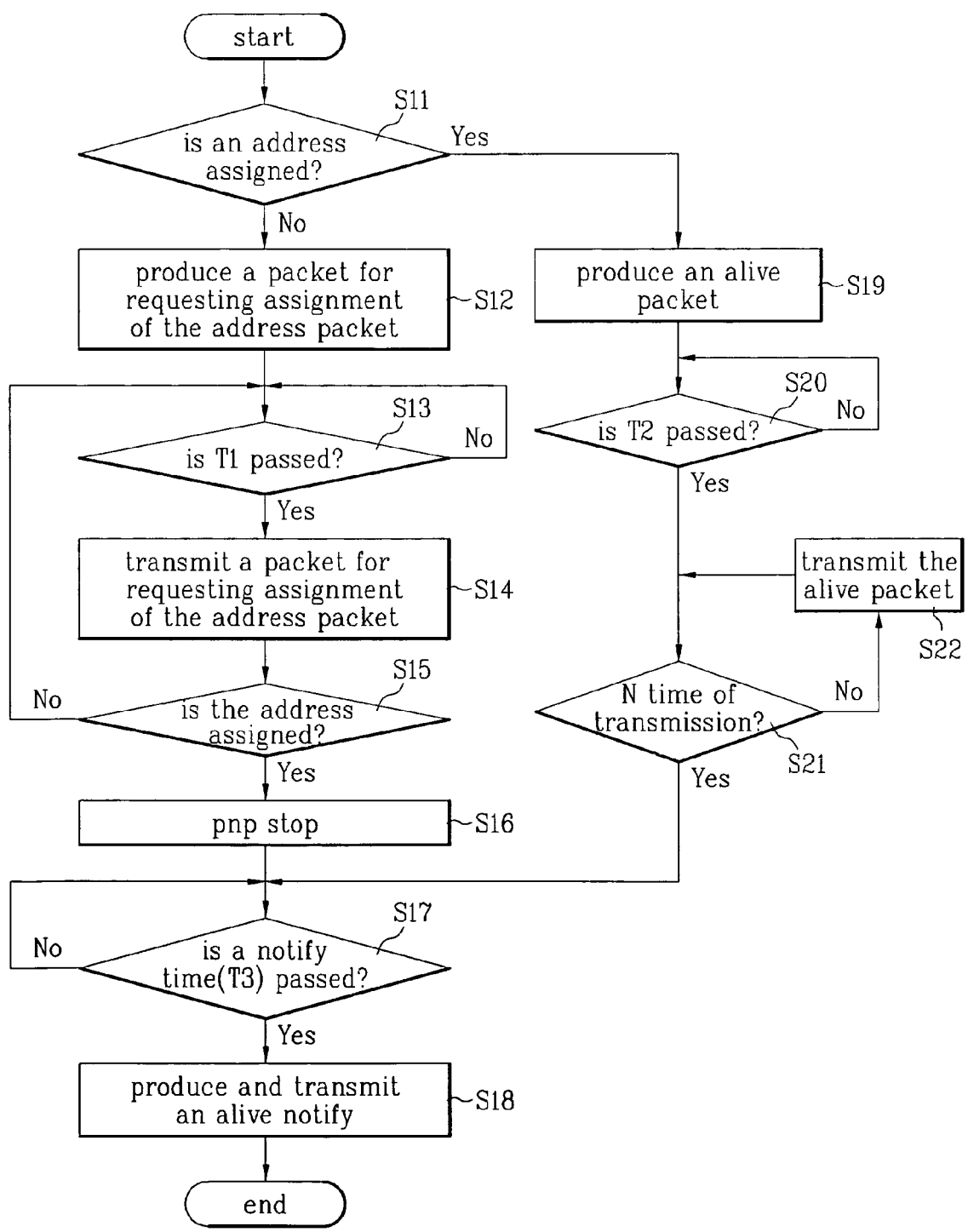
FIG. 3 illustrates a flow chair showing a method for verifying a connection state of home appliances in a home network system in accordance with a preferred embodiment of the present invention.

FIG. 2 illustrates a block diagram showing a method for verifying a connection state of home appliances in a home network system in accordance with a preferred embodiment of the present invention, and FIG. 3 illustrates a flow chart showing a method for verifying a connection state of home appliances in a home network system in accordance with a preferred embodiment of the present invention.

Referring to FIG. 2, the method for verifying a connection state of home appliances in a home network system includes the steps of respective home appliances 200-500 determining connection thereof to a network, and assignment of an address thereto periodically, and transmitting a packet requesting for assignment of the address to the network managing appliance 100 when no address is assigned thereto.

The method for verifying a connection state of home appliances in a home network system will be explained with reference to FIG. 3.

Assignment of addresses to respective home appliances is determined (S11).

If no address is assigned as a result of the determination (S11), a packet for requesting assignment of the address is formed for transmission to the network managing appliance (S12).

Then, pass of a preset time period T1 is determined (S13).

Then, if the preset time period T1 is passed as a result of the determination (S13), the packet for requesting assignment of the address is transmitted to the network managing home appliance (S14).

Assignment of the address from the network managing appliance is determined (S15).

Then, if the address is assigned from the network managing appliance as a result of the determination (S15), a PnP is stopped (S16).

Then, pass of a notify time period T3 is determined (S17).

As a result of the determination (S17), if the notify time period T3 is passed, an alive notify is produced and transmitted (S18).

Opposite to this, as a result of the determination (S11), if the address is assigned thereto, an alive packet is formed for informing that the address is assigned at the present time to the network managing appliance (S19).

Then, pass of a preset time period T2 is determined (S20).

As a result of the determination (S20), if the preset time period T2 is passed, it is determined whether a number of transmission times are 'N' (S21).

Then, as a result of the determination (S21), if the number of transmission times is 'N', the process is terminated, and if the number of transmission times is not 'N', the formed alive packet is transmitted to the network managing appliance (S22).

As explained, in the method for verifying a connection state of a home appliance of the present invention, once the appliances are connected to the network, each of the appliances transmits a packet to the network managing appliance at fixed time intervals, informing a connection state of the appliance, and requesting assignment of the address.

The packet transmission is continued until the network managing appliance assigns the address. Each of the appliances having the address assigned thereto and connected to the network transmits a packet notifying alive of the appliance for 'N' times, then, stops the transmission.

Then, after a preset time period, the appliance having the address assigned thereto produces an alive notify packet, and transmits to the network managing appliance, so that the network managing appliance can always know connection states of the appliances.

The alive notify packet has a structure as shown in table 1 below.

TABLE 1

| Packet head | — Alive order | Appliance state | CRC |
|---|---|---|---|

The appliance state includes on/off of the appliance, alive notify time, and the like, and the CRC is bits for checking an error.

It will be apparent to those skilled in the art that various modifications and variations can be made in the method for verifying a connection state of a home appliance of the present invention without departing from the spirit or scope of the invention. Thus, it is intended that the present invention cover the modifications and variations of this invention provided they come within the scope of the appended claims and their equivalents.

INDUSTRIAL APPLICABILITY

The method for verifying a connection state of a home appliance of the present invention permits to know a connection state of an appliance effectively, even if the connection state of the appliance is changed, by making the appliance to transmit a packet that informs the appliance is connected to the network and requests a network managing appliance for assignment of an address if no address is assigned to the appliance.

What is claimed is:

1. A method of confirming a connection of a home appliance to a home network system including a plurality of home appliances, without a request for notifying the state of the home appliance by a networking managing appliance, the method being preformed by the home appliance and comprising:

determining, when the home appliance initiates the connection to the home network system, whether the home appliance has a home network address, if the home appliance does not have the home network address, performing a first operation,
   wherein the first operation comprises:
      generating a request-packet for requesting the home network address;
      transmitting the request-packet to the network managing appliance by an interval of preset time period T, until the home network address is assigned to the home appliance by the network managing appliance;
   if the home appliance has the home network address, performing a second operation,
   wherein the second operation comprises:
      generating an alive-packet, and
      transmitting the alive-packet to the network managing appliance for a preset N times for a preset time period T2; and
   performing a third operation,
   wherein the third operation comprises:
      generating an alive-notifying-packet for notifying the connection of the home appliance to the home network system, and
      transmitting the alive-notifying-packet to the network managing appliance after a preset time period T3.

2. A method as claimed in claim 1, wherein the first operation further comprises stopping a plug and play (PnP).

3. A method as claimed in claim 1, wherein the alive-notify-packet includes at least one of a packet head, an alive order, and an appliance state.

4. A home appliance for confirming a connection to a home network system including a plurality of home appliances, without a request for notifying the state of the home appliance by a network managing appliance, the home appliance comprising:

an interface unit configured to communicate data with the network managing appliance; and
   an controller configured to:
   determine, when the home appliance initiates the connection to the home network system, whether the home appliance has a home network address;
      if the home appliance does not have the home network address, performing a first operation,
      wherein the first operation comprises:
         generating an request-packet for requesting the home network address, and
         transmitting, via the interface unit, the request-packet to the network managing appliance by a interval of preset time period T1, until the home network address is assigned to the home appliance by the network managing appliance;
      if the home appliance has the home network address, performing a second operation,
      wherein the second operation comprises:
         generating an alive-packet, and
         transmitting, via the interface unit, the alive-packet to the network managing appliance for a preset N times for a preset time period T2; and
      perform a third operation,
      wherein the third operation comprises:
         generating an alive-notifying-packet for notifying the connection of the home appliance to the home network system, and
         transmitting, via the interface unit, the alive-notifying-packet to the network managing appliance after a preset time period T3.

* * * * *